Dec. 5, 1967   P. G. TACCHI   3,356,101
APPARATUS FOR MIXING FLUIDS AT DIFFERENT TEMPERATURES
Filed Jan. 13, 1965   4 Sheets-Sheet 1

INVENTOR
Percy George Tacchi
BY
ATTORNEYS

INVENTOR
Percy George Tacchi

INVENTOR
Percy George Tacchi

BY

ATTORNEYS

United States Patent Office 3,356,101
Patented Dec. 5, 1967

3,356,101
APPARATUS FOR MIXING FLUIDS AT DIFFERENT TEMPERATURES
Percy George Tacchi, Bridgnorth, England, assignor to Slip International Limited, London, England, a British company
Filed Jan. 13, 1965, Ser. No. 425,144
Claims priority, application Great Britain, Jan. 22, 1964, 2,808/64
7 Claims. (Cl. 137—114)

ABSTRACT OF THE DISCLOSURE

A valve for mixing together steam and cold water to produce hot water and for injecting a secondary fluid (such as detergent or disinfectant) into the hot water within the valve. The valve has a cylindrical body within which is a movable pressure responsive device which may be a piston or a bellows and which divides the space within the body into high and low pressure chambers, the outlet for cold water being in the high pressure chamber at one end of the body and the steam inlet and hot water outlet being at the other end of the body. There is a passage of restricted cross section through the wall of the body for the cold water to pass from the high pressure chamber to the low pressure chamber, thus creating a differential pressure across the piston or bellows and the steam inlet is controlled by the valve member which is connected to the piston or bellows so that the steam inlet valve follows the movement of the piston or bellows. A pumping device for injecting the secondary fluid is operated by the movement of the piston or bellows and comprises a cylinder and a piston, one of which elements is connected to the piston or bellows of the pressure responsive device, and the other of which is fixed rigidly with the body of the valve, the pumping device having an inlet connected to a supply of the secondary fluid and a discharge into the interior of the valve body.

This application is a continuation-in-part of prior application, Serial No. 404,249, filed Oct. 16, 1964 and now abandoned.

This invention relates to apparatus for mixing two fluids which are at different temperatures (a cold and a hot fluid) to provide a hot fluid mixture at a substantially constant temperature.

Although the apparatus of the present invention is capable of use with various fluids, including gaseous fluids, hereinafter for the purpose of clarity, reference is made only to the case where the hot fluid is steam and the other fluid is cold water which are mixed for the purpose of providing a supply of hot water.

According to the invention there is provided apparatus for mixing steam and cold water to provide hot water comprising a high pressure chamber having an inlet for the cold water, a low pressure chamber, forming a mixing chamber, having an outlet for the hot water and a valve controlled inlet for the steam, a passage of restricted cross-section forming a communication between the high pressure and low pressure chambers, a pressure responsive device operatively disposed between said chambers so as to be under the influence of the differential pressure between said chambers, and a valve member, controlling the inlet of steam to the low pressure chamber, which valve member is connected with said pressure responsive device so that its opening and closing is controlled by movement of the pressure responsive device in response to change in said differential pressure.

Two forms of apparatus in accordance with the invention are illustrated in the accompanying drawings and are described in more detail hereinafter, by way of examples.

Figure 1:
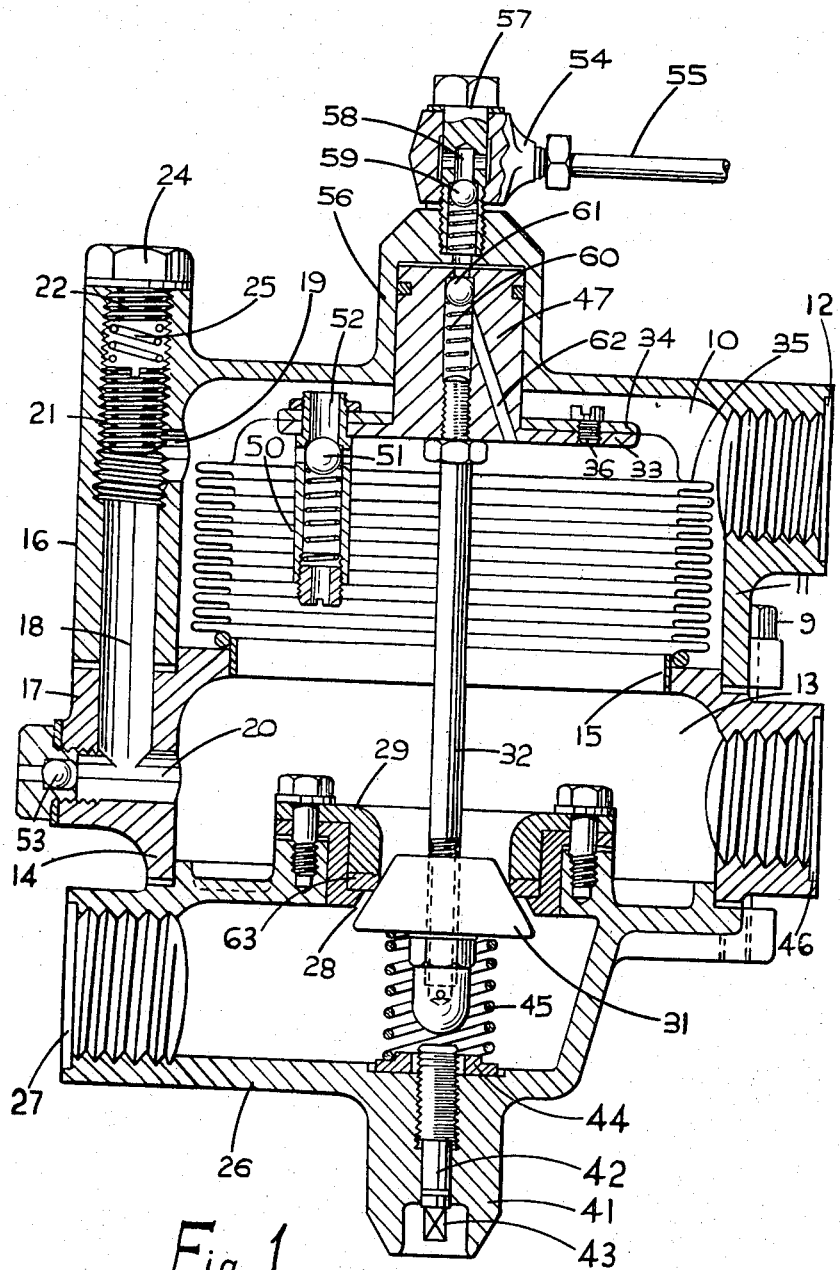
Figure 2:
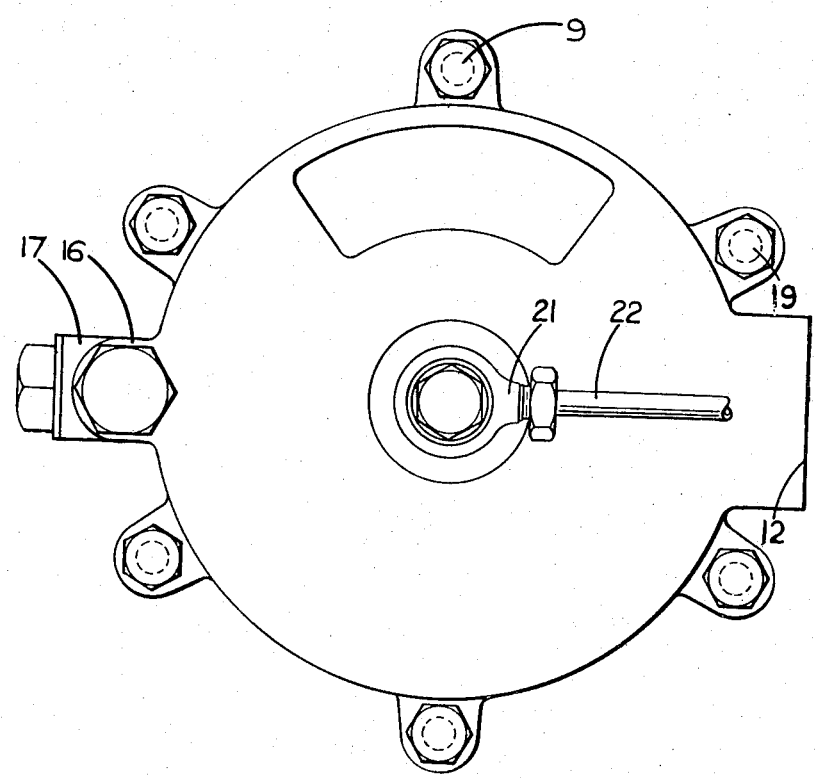
Figure 3:
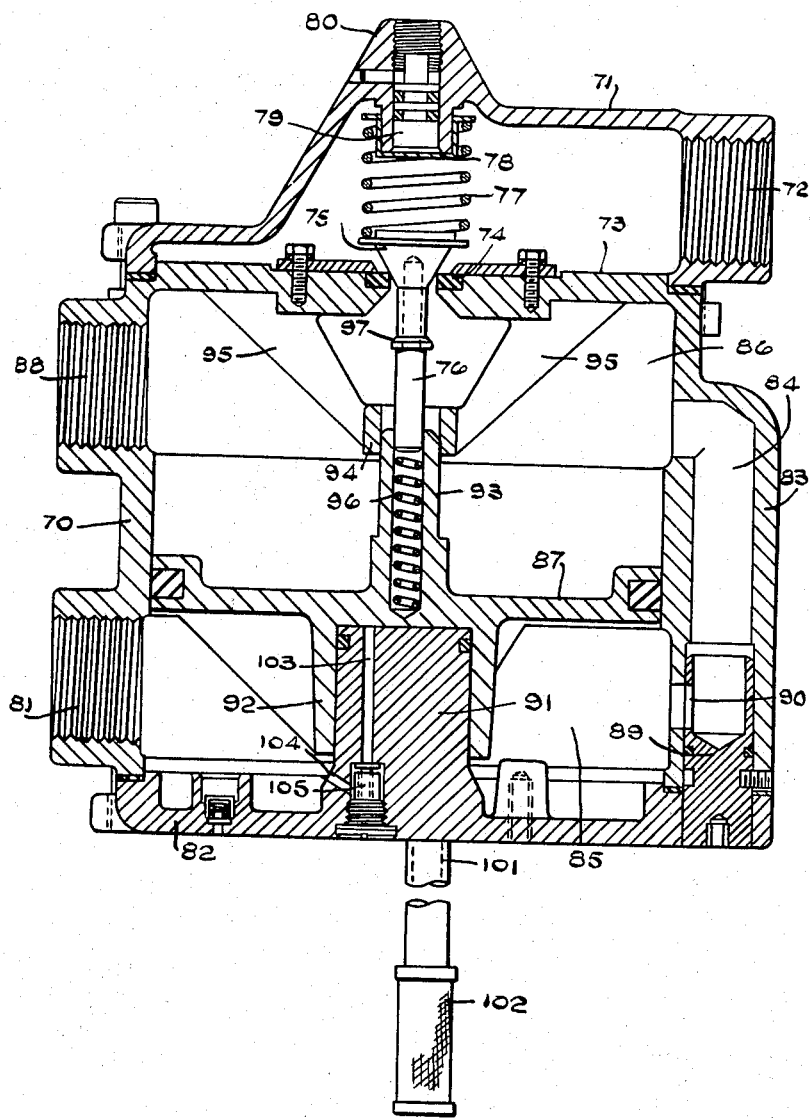
Figure 4:
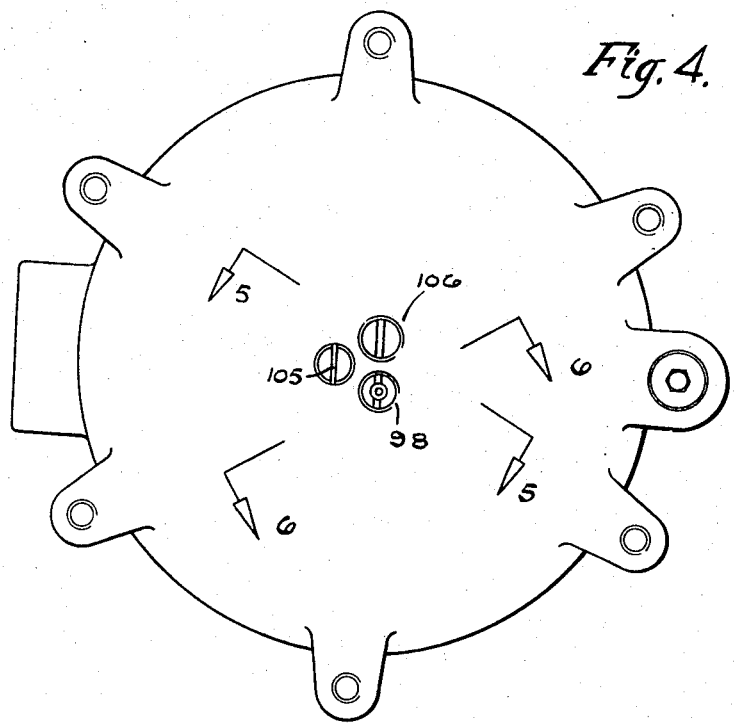
Figures 5, 6:
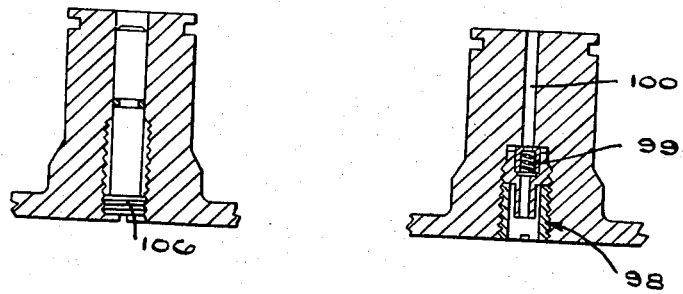

FIGURE 1 is a section through one form of valve for mixing steam and cold water to provide hot water.
FIGURE 2 is a plan view of FIGURE 1.
FIGURE 3 is a section through another form of valve for mixing steam and cold water.
FIGURE 4 is a bottom plan view on FIGURE 3.
FIGURE 5 is a section on line 5—5 of FIGURE 4.
FIGURE 6 is a section on line 6—6 of FIGURE 4.

Each valve shown also embodies a device for dispensing a quantity of a secondary fluid into the mixture and this additional device forms the subject of my co-pending application No. 404,249.

With reference to FIGURE 1 which shows a cross-section on a centre line of the apparatus, the high pressure chamber 10 is provided in the interior of the upper body part 11 which is of generally cylindrical configuration for the supply of cold water. The low pressure chamber and mixing chamber is formed in the interior 13 of the lower body part 14 which is secured to the upper body part 11 by suitable screws 9.

At one side, the body part 11 has a projection 16 which mates with a corresponding projection 17 on the lower body part and each of these projections is provided with a communicating passage which constitutes a by-pass passage 18 of restricted cross-section extending, and providing a communication, between the high pressure chamber 10 and the low pressure chamber 13. At the upper end, the passage 18 communicates with the high pressure chamber 10 through the opening 19 and at the lower end the passage 78 communicates with the low pressure chamber 13 by means of the opening 20.

Means are provided for controlling and adjusting the operative cross-sectional area of the opening 19 through which the cold water passes between the high and low pressure chambers so as to vary the drop in pressure which exists when water is flowing through such passage and such means takes the form of an externally screwed plug 21 screwing into the internally threaded passage 22 at the upper end of the restricted passage 18, the lower end of the plug 21 being arranged to project across the opening 19 so that, when rotated, the plug 21 is moved axially to increase or decrease the operative area of cross-section of the passage 19 through which water discharges from the high pressure chamber 10.

The upper end of the passage 22 is provided with a removable screw plug 24 and a coil spring 25 acts between this and the screw plug 21 to prevent any unintentional rotation of the plug 21 during use of the apparatus. The screw plug 24 can be removed whilst the apparatus is in operation to permit of easy adjustment of the screw plug 21 when it is desired to vary the differential pressure existing between the high and low pressure chambers.

The underside of the lower body part 14 has secured thereto the steam chest 26 which is provided with a suitable inlet 27 adapted for connection to the steam supply and having in its upper wall an opening 28 providing communication between the interior of the steam chest and the interior of the low pressure chamber 13 and this space 13 also forms a mixing chamber where the steam is condensed into the cold water.

The opening 28 is provided with a renewable valve seat 63 held in position by a retainer 29 and passage of steam through the opening is controlled by a suitable valve member 31 secured to the lower end of a valve stem 32 which extends upwardly through the low pressure chamber and near its upper end is externally threaded and this upper end engages in a threaded hole in the lower end of a piston 47. Secured to the piston 47 is a circular plate 33 which forms the one part of a two part clamping device for the upper end of a pressure responsive bellows.

The other part of the clamping device comprises the circular plate 34 integral with the piston 47 and the closed end of the bellows 35 is trapped between the plates 33 and 34 which are secured together by suitable screws 36. At its lower end the bellows 35 is connected in sealing engagement to the outer face of the ring 15 fixed in the upper wall of the lower body part 17.

The bottom wall of the steam chest 26 is formed with an internally screw sleeve 41 in which is threaded the stem 42, the outer end 43 of which can be turned to move the stem axially, and the inner end of this stem 42 passses through a ring 44 which is engaged by the lower end of a spring 45 the upper end of which bears against the underside of the valve plug 31, thus urging the valve plug in the direction to close the inlet 28.

The purpose of the adjustable stem 42 is to limit the stroke of the piston 47 in its cylinder as is described more fully hereinafter.

The apparatus so far described, operates as follows. In the static state when there is no demand for hot water, there will be no flow of fluid through the apparatus and the pressures on the opposite sides of the bellows 35 (i.e. chamber 10 and chamber 13) will be equal and the steam valve plug 31 will be in the closed position and in addition to the force exerted by the spring 45, and the spring resistance of the bellows, the steam pressure itself operates to hold the valve closed as it acts on the underside of the valve plug 31. The hot water is discharged through the outlet 46 to which is connected a pipe line for supplying hot water to wherever it is required and which line will include some form of hot water control valve.

When it is desired to draw off hot water and the hot water control valve is opened, the flow of cold water into the chamber 10 and through the restricted passages 19 and 18, causes a differential pressure to be created between the opposite sides of the bellows and the excess pressure acting on the outside of the bellows, causes this to contract against the resistance of the spring 45 thus moving the valve stem 32 downwardly and opening the steam valve plug 31 and allowing steam to enter and mix with cold water in proportion to the flow of cold water into the mixing chamber 13. The hot water is discharged through the outlet 46 which is adapted for connection to a suitable pipe line for supplying the hot water to wherever it is required. For example, it may be supplied through a flexible hose to a spray gun used for washing purposes or it may be supplying a battery of taps.

The control of the apparatus may also be obtained by controlling the flow of cold water into the apparatus, such as by means of a control valve in the cold water supply line.

In the event of any fluctuation in the steam pressure, such increase or decrease in pressure is communicated to the interior of the lower pressure chamber 13 resulting in a corresponding movement of the bellows to move the steam valve plug 31 more towards the closed, or towards the open, position respectively, so as to adjust the inlet of steam and maintain substantially constant temperature of the hot water mixture.

The upper end of the bellows 35 is preferably fitted with one or more safety valves, as shown at 50, the or each which included a ball valve 51 controlling a passage 52 which provides a communication between the opposite sides of the bellows, the ball valve being spring loaded and adjustable in the usual way.

Where the apparatus is supplying hot water to a remote point, such as a spray gun via a flexible hose, the flow of fluids through the apparatus is controlled but if an accident occurs resulting in control over the outlet flow being lost (such as a burst hose or the spray gun becoming disconnected from the hose) then there would be a sudden very heavy increase in flow under the full force of the cold water pressure with a resultant very high differential pressure across the bellows which might be more than the maximum permissable pressure for the bellows. The presence of one or more safety valve prevents damage to the bellows in such as case as the, or each, valve can be set to open at a maximum pressure below that which would damage the bellows and thus control the differential pressure between the chambers 10 and 13 and avoid damage.

Two such safety valves may be fitted, one designed to open at a higher pressure than the other. In addition to the above described safeguard, such arrangement operates to provide a safe working maximum rate of flow. When the rate of flow is progressively increased, by opening up the inlet control or progressively increasing the outlet (e.g. opening up more taps in a battery of taps), a point is reached where the hot water temperature reaches, or exceeds, a predetermined maximum and at this corresponding differential pressure one of the safety valves will open to give a drop in the differential pressure. A further increase in rate of flow will cause the second safety valve to open and the combined areas of the openings 52 and passage 18, in relation to the area of inlet 13, is such that there can be no further increase of differential pressure to exceed the maximum permissable pressure for the bellows.

The ball valve shown at 53 is for the purpose of preventing any back-syphoning action from occurring (e.g. if the outlet of the apparatus was above the inlet) which might lead to a flow of contaminated fluid back into the cold water supply. Normally the ball is held on its seat by pressure greater than atmospheric within the apparatus but in the event of back-syphoning occurring the ball will open under the greater atmospheric pressure.

If the above described apparatus is to be used in cases where it is desired to mix some secondary fluid with the hot water mixture, then the additional device hereinafter described may also be embodied. For example, when used with a spray gun for washing purposes, there may be provided a secondary fluid such as a detergent, or in cases where excessively hard water is being used, the secondary fluid may be such as is needed to avoid the creation of deposits arising from the hard water.

Where the supply of secondary fluid is required, the inlet connection 54, leading to a supply of secondary fluid by way of pipe 55, is fitted to the upper wall of the apparatus, such upper wall being formed with a cylinder 56 in which the piston 47 operates. The connection 54 is secured to the cylinder 56 by the screw plug 57 which has a through passage 58, controlled by a non-return ball valve 59, leading to the space above the piston 47. The piston 47 has an axial passage 60, controlled by a non-return ball valve 61, leading to a transverse passage 62 through the piston to communicate with the interior of the low pressure mixing chamber 13. The dispensing device operates as follows.

When the steam valve plug 31 opens, the valve stem 32 moves downwardly drawing the piston 47 downwardly so as to draw in a quantity of the secondary fluid into the cylinder 56 and this quantity of fluid is discharged past the ball valve 61 via passages 60 and 62 into the hot water mixture when the valve stem 32 next moves upwardly.

The most common use of this apparatus would be for washing purposes using a spray gun or like jet to deliver hot water containing a detergent and in these cases the operation of the piston 47 can be controlled by the operator of the spray gun by shutting down the spray gun every time it is desired to inject a quantity of secondary fluid into the hot water mixture. The closing of the spray gun outlet results in the stoppage of flow of cold water into the apparatus through inlet 12 and an equilisation of the pressures across the bellows so that the steam valve is closed and the quantity of secondary fluid in the cylinder 56 is discharged into the mixing chamber so that when the spray gun is again opened up, the required amount of secondary fluid is discharged with the mixture and at the same time a further quantity of the secondary fluid is drawn into the upper end of the cylinder 56. The flow of hot water plus secondary fluid continues for a limited period after which there is a flow of clear hot water for rinsing purposes for as long as desired.

The dispensing device above described is the subject of co-pending application No. 404,378 filed Oct. 16, 1964 (now Patent No. 3,228,560).

The adjustable stem 42 restricts the stroke of the piston 47 and thus limits the intake of secondary fluid to obtain the correct ratio of secondary fluid to water. The cap nut on the lower end of stem 32 will engage the upper end of the screwed stem 42 to limit the stroke. This arrangement also limits the extent of compression of the bellows 35 as undue or excessive compression may lead to deformation and shortening of the life of the bellows.

The adjustment downwards of stem 42 is limited by the shoulder inside sleeve 41 so that the maximum stroke of the piston is when the lower end of stem 32 comes substantially flush with the plate 44.

The valve plug 31 and seat 63 can be fitted in different sizes, according to requirements, and the stroke of the stem 32 will be limited (by adjustment of screwed stem 42) according to the size of steam inlet 28 being used in any particular apparatus.

When the apparatus is static, spring 45 holds the steam water plug closed against any differential pressure which may exist between the waste in chamber 13 and steam in steam chest 26.

The apparatus embodying the dispenser device for injection of secondary fluid, may advantageously be used with a spray gun of the form having a plurality of different sized outlet jets any one of which may be brought into operation at will. With this arrangement the apparatus may be adjusted so that when using one of the smaller sized jets, the flow of cold water through the apparatus is insufficient to create the differential pressure required to move the bellows 35 so that with this small jet in use, a continuous spray of cold water for rinsing purposes is available. When hot water mixed with detergent for washing is required, the spray gun is adjusted to make use of one of the larger jets and the resultant increased flow of cold water into the apparatus then creates sufficient differential pressure to move the bellows 35 and open the steam valve plug 31 to admit the steam and provide hot water mixture and also operate the dispensing device.

When the apparatus is used simply as a valve for mixing steam and cold water without the dispensing device, the connection 54 is not present, and there remains a small opening to atmosphere in the end of cylinder 56 above the piston 47. The pressure on the underside of the piston 47, being greater than atmospheric, assists the spring 45 and bellows in the closing of the steam valve 31.

In a modification the screw plug 21 may be adjusted automatically by a temperature responsive device under the influence of the temperature of the hot water discharge from 46 to provide a close temperature control, such as by means of a fluid-filled capsule the expansion and contraction of which will transmit movement to plug 21 by way of fluid pressure.

In connection with the description of the dispenser device given above, an alternative arrangement may be employed in which the cylinder of the dispensing device is connected to the end of the bellows so as to be movable therewith and the piston is in this case a fixed piston formed with, or provided in, the end wall of the hollow body, similar to the arrangement hereinafter described with reference to FIGURES 3–6. It will be appreciated that the operation of such dispensing device would be the same as above described but the position of the piston and cylinder are reversed.

Furthermore, in place of a piston and cylinder arrangement, any other form of pumping device may be used operatively connected to the closed end of the bellows or other pressure responsive device and deriving its operative movement from the movement of the bellows or the like.

In the form of apparatus shown in FIGURES 3 to 6 the cylindrical hollow body 70 and other parts are arranged so that in the normal position for operation the steam inlet will occupy the upper position although it will be appreciated that it is not essential for the apparatus to occupy his position, and this is only a preferred manner.

At the upper end of the cylindrical body 70 there is fitted the steam inlet chest 71 with an inlet opening 72 adapted for connection to the steam supply pipe, and the end wall 73 of the hollow body is provided centrally thereof with a valve seating 74 which is engaged by the valve member 75 fitted to the upper end of an axially extending valve stem 76. The valve member 75 is spring urged onto the seating 74 by the coil spring 77 acting between the upper face of the valve member 75 and the flanged end of the cup-shaped washer 78, and the compression of the spring 77 can be varied by means of the manually operable adjusting screw 79 fitted in the axially extending boss 80 in the steam inlet chest 71.

At the lower end the hollow body 70 is provided with an inlet 81 adapted for connection to the cold water supply and this end of the body is closed by an end wall cap 82. At one side the body has a projection 83 through which extends the passage 84 forming communication between the high pressure chamber 85 and the low pressure chamber 86, these chambers being defined as on opposite sides of the piston 87 which is disposed slidably within the hollow body 70.

The low pressure chamber 86 has an outlet 88 for the hot water, this outlet being adapted to be connected to the unit which is to be supplied, such as a spray gun or fountain or showers.

Also, as in the previous construction, the passage 84 of restricted cross-section is fitted with a plug 89 which can be adjusted to vary the effective cross-sectional area of the opening 90 from the high pressure chamber 85 into the passage 84.

In the case where the apparatus is required only for mixing cold water and steam to produce hot water the valve stem 76 would be connected directly to the piston 87, but this particular construction of apparatus utilising a piston instead of a bellows is particularly suitable for combination with the secondary fluid dispensing device and there is therefore provided in the apparatus a pumping device for pumping a certain amount of secondary fluid into the hollow body.

The end wall cap 82 is formed with an upwardly projecting, integrally formed plunger 91 which is of circular cross-section and is engaged telescopically by a downwardly projecting open-ended sleeve 92 formed integrally with the piston 87 on the side thereof adjacent the high pressure chamber and this sleeve 92 constitutes the cylinder cooperating with the plunger 91 to provide the pumping device.

On the side of the piston 87 adjacent the low pressure chamber there is an upwardly and axially extending sleeve 93 which engages telescopically with the valve stem 76 and which is guided in the collar 94 carried by the arms 95 of a spider formed integrally with the end wall 73 of the hollow body.

A coil spring 96 is disposed inside the sleeve 93 and acts between the piston 87 and valve stem 76 to urge these two apart.

Intermediate its lower end and the valve member 75 the valve stem 76 is provided with a radially extending flange 97.

In the plunger 91 there is fitted an inlet connection 98 for the secondary fluid (see FIGURES 4 and 6) and this consists of a spring loaded non-return valve 99 at the end of the passage 100 extending through the plunger to the inner end of the cylinder 92 and the inlet fitting 98 being adapted for connection to a supply pipe 101 fitted with a strainer 102 and adapted to be inserted in a supply container for the secondary fluid.

The secondary fluid which is drawn into the cylinder 92 through the inlet passage 100 is discharged through an outlet passage 103 extending downwardly through the plunger and communicating with the transverse passage 104 through the medium of a non-return valve 105 whereby secondary fluid is discharged into the high pressure chamber 85 and thus conveyed into the hot water produced in the low pressure chamber 86 when the steam valve 75 opens and admits steam.

With reference to FIGURE 5, there is shown a means of adjusting the quantity of secondary fluid discharged into the apparatus by adjusting the relative stroke between the cylinder 92 and plunger 91 and this consists of an adjusting screw 106 mounted in an internally threaded opening in the plunger 91 whereby axial adjustment of the screw 106 to bring its inner end beyond the inner end of the plunger will vary the relative stroke between the cylinder and plunger.

With this form of apparatus, when the unit, such as a spray gun or the like, is opened up and there is flow through the apparatus, the differential pressure caused by the flow of fluid through the passage 84 results in upwards movement of the piston 87 and for the first part of this movement there is no opening of the steam valve member 75 as the spring 96 is being compressed. The steam valve member 75 does not commence to open until the upper end of the sleeve 93 engages the flange 97 on the valve stem 76, thereafter further upwards movement of the piston 87 results in the valve member 75 being lifted off its seat to admit steam into the low pressure chamber 86 to mix with the cold water and produce hot water.

Such upwards movement of the piston 87 has created suction in the pumping device to draw into the cylinder 92 a quantity of secondary fluid which is then discharged into the apparatus when the piston 87 next descends under the influence of decrease in the differential pressure and also under the influence of springs 96 and 77.

What I claim is:

1. Apparatus for mixing steam and cold water to provide a hot water mixture comprising a substantially cylindrical, hollow body, a high pressure chamber having an inlet for cold water at one end of said body, a low pressure chamber, in which the two fluids mix, having an outlet for the hot water mixture and an inlet for steam at the other end of said body, valve means controlling said steam inlet, the high and low pressure chambers being in communication through a passage of restricted cross-section, a pressure responsive device disposed co-axially within said hollow body (between said chambers and operatively movable axially of said hollow body), the opposite sides of the pressure responsive device being exposed to the pressures within said chambers, means connecting said valve means to said pressure responsive device, a pumping device connected with said pressure responsive device, said pumping device having a cylinder and piston, relative reciprocation of which is caused by operative movement of the pressure responsive device, inlet means for a supply of secondary fluid and discharge means for said fluid communicating with the interior of the hollow body.

2. Apparatus according to claim 1, wherein the wall of the hollow body has a projection at one side and said projection has the said passage of restricted cross-section extending therethrough and communicating at its ends with the high and low pressure chambers respectively through openings in the wall of the body.

3. Apparatus according to claim 2, wherein an adjustable plug is mounted in said passage of restricted cross-section at one end thereof with the end of the plug controlling the opening through the wall of the body at this end of the passage to vary the operative cross-sectional area of said opening.

4. Apparatus according to claim 1 wherein the pressure responsive device comprises a bellows disposed co-axially within said hollow body with the closed end of the bellows adjacent the cold water inlet end of the body and the open end of the bellows secured to the interior wall of the body in between the cold water inlet and hot mixture outlet, the exterior and interior of the bellows being exposed, respectively, to the pressure in the high pressure chamber and the low pressure chamber, said steam inlet being formed in the end of the hollow body remote from the closed end of the bellows, a valve stem connected at one end to said valve member, extending axially within said bellows and connected at its other end to the closed end of said bellows, and wherein the pumping device piston is connected to the end of said bellows and projects outwardly therefrom, the cylinder of the pumping device being formed on the adjacent end of the hollow body, said cylinder having an inlet connection for a supply of a secondary fluid and said piston being slidable in said cylinder and having a passage extending therethrough providing communication between the interior of said cylinder and the interior of the bellows.

5. Apparatus according to claim 1 wherein the pressure responsive device comprises a piston slidable within said hollow body so as to have one side exposed to the interior of said high pressure chamber and the other side exposed to the interior of said low pressure chamber.

6. Apparatus according to claim 1 wherein the pressure responsive device comprising a piston slidable within said hollow body so as to have one side exposed to the interior of said high pressure chamber and the other side exposed to the interior of said low pressure chamber, and a valve stem extending from said valve member axially within the hollow body and having its free end engaging with said piston.

7. Apparatus for mixing steam and cold water to provide a hot water mixture comprising a substantially cylindrical, hollow body, a high pressure chamber having an inlet for cold water at one end of said body, a low pressure chamber, in which the two fluids mix, having an outlet for the hot water mixture and an inlet for steam at the other end of said body, a valve member controlling said steam inlet, the high and low pressure chambers being in communication through a passage of restricted cross-section, a piston slidable within said hollow body so as to have one side exposed to the interior of said high pressure chamber and the other side exposed to the interior of said low pressure chamber, a valve steam extending from said valve member axially within the hollow body, a sleeve extending axially from the piston within the low pressure chamber, a coil spring located within said sleeve, said valve stem being telescopically slidable within said sleeve against the resistance of the spring, abutment means on the valve stem engageable by the end of said sleeve, a cylinder extending co-axially from the piston in the high pressure chamber, a plunger fixed to and extending from the adjacent end wall of the hollow body, said plunger and cylinder having telescopic engagement and inlet and discharge means for a supply of secondary fluid located within said plunger, said discharge means communicating with said low pressure chamber.

(References on following page)

References Cited

UNITED STATES PATENTS

| | | | |
|---|---|---|---|
| 862,867 | 8/1907 | Eggleston | 251—61.1 |
| 1,172,527 | 2/1916 | Hill | 137—111 |
| 1,546,998 | 1/1923 | Rogers | 137—111 |
| 2,635,634 | 4/1953 | Thurber | 251—44 |
| 2,921,597 | 1/1960 | Parr | 137—116.5 |
| 3,210,938 | 10/1965 | Mendez | 251—77 |
| 3,228,560 | 10/1966 | Tacchi | 222—129.2 |

WILLIAM F. O'DEA, *Primary Examiner.*

W. H. WRIGHT, *Assistant Examiner.*